United States Patent [19]
Hopkins

[11] Patent Number: 5,974,498
[45] Date of Patent: *Oct. 26, 1999

[54] LOADING PAGE REGISTER WITH PAGE VALUE IN BRANCH INSTRUCTION FOR AS FAST ACCESS TO MEMORY EXTENSION AS IN-PAGE ACCESS

[75] Inventor: Harland Glenn Hopkins, Missouri City, Tex.

[73] Assignee: Texas Instruments Incorporated, Dallas, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/719,040

[22] Filed: Sep. 24, 1996

[51] Int. Cl.$^6$ ........................................... G06F 9/32
[52] U.S. Cl. ................................................... 711/2
[58] Field of Search ...................... 711/2, 220; 395/384, 395/589, 598, 389, 580; 712/233

[56] References Cited

U.S. PATENT DOCUMENTS

| | | | |
|---|---|---|---|
| 3,786,436 | 1/1974 | Zelinski et al. | 711/213 |
| 3,970,999 | 7/1976 | Elward | 711/2 |
| 3,980,992 | 9/1976 | Levy et al. | 712/247 |
| 3,988,604 | 10/1976 | Raymond, Jr. | 708/190 |
| 4,074,355 | 2/1978 | Tubbs | 712/32 |
| 4,374,417 | 2/1983 | Bradley et al. | 711/202 |
| 4,713,748 | 12/1987 | Magar et al. | 712/225 |
| 4,893,235 | 1/1990 | Butts, Jr. et al. | 712/208 |
| 5,072,418 | 12/1991 | Boutaud et al. | 708/207 |
| 5,666,510 | 9/1997 | Mitsuishi et al. | 711/220 |

*Primary Examiner*—Kenneth S. Kim
*Attorney, Agent, or Firm*—Gerald E. Laws; Robert D. Marshall, Jr.; Richard L. Donaldson

[57] ABSTRACT

An improved microcomputer has a page register connected to a program counter in order to extend the program address range of the microcomputer. A page stack is connected to the pager register and operates in conjunction with an address stack. The page register is loaded from bits in the first word of a two word branch or call instruction in such a manner that no additional execution time is required nor are any additional instructions required to provide the extended address range. A predefined microprocessor ASIC cell is augmented by externally connecting a page register and an opcode decoder so that instruction memory address range can be expanded by paging without redesigning the microprocessor cell.

10 Claims, 6 Drawing Sheets

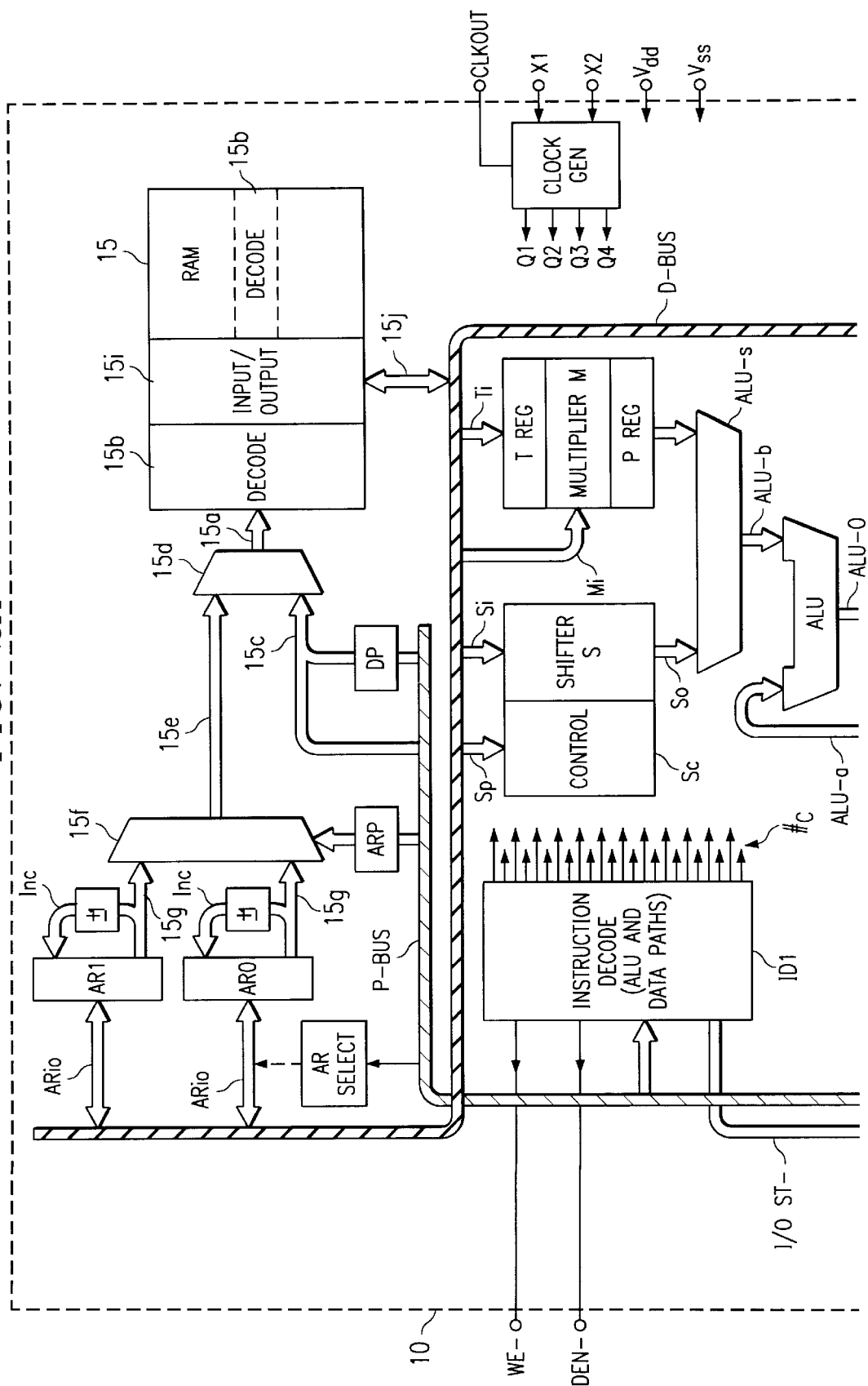

LOADING PAGE REGISTER WITH PAGE VALUE IN BRANCH INSTRUCTION FOR AS FAST ACCESS TO MEMORY EXTENSION AS IN-PAGE ACCESS

FIELD OF THE INVENTION

This invention is in the field of semiconductor integrated devices and systems and more particularly to features of a high-speed, miniaturized, electronic digital signal processing system in single-chip microcomputer form.

BACKGROUND OF THE INVENTION

A microprocessor device is a central processing unit or CPU for a data processing device which is usually contained in a single semiconductor integrated circuit "chip" fabricated by "MOS/LSI" technology. The term "microcomputer" will be used herein to refer to a microprocessor which may have on-chip memory for program and data storage. Modern microprocessors can be grouped into two general classes, namely general-purpose microcomputers and special-purpose microcomputers. Special-purpose microcomputers can be structured in such a manner that the performance of a specific function by the special-purpose microcomputers greatly exceeds the performance of the same function by a general-purpose microcomputer, regardless of the program created by the user.

One such function which can be performed by a special-purpose microcomputer at a greatly improved rate is digital signal processing. Digital signal processing applications, because of their computation intensive nature, also are rather intensive in memory access operations. The increasing demands of technology and the marketplace make desirable increased amounts of memory so that more complex functions and combinations of functions can be performed.

Among the objects of the present invention are to provide improved data processing devices that can address larger memory structures while maintaining high processing speeds. Another object of the present invention is to provide improved addressing with only minimal additional complexity in the data processing device, and to retain instruction code compatibility with an unimproved data processing device.

Other objects and advantages will be apparent to those of ordinary skill in the art having reference to the following figures and specification.

SUMMARY OF THE INVENTION

In accordance with the present invention, a data processing device which has an instruction register for holding an instruction, an instruction decoder, an arithmetic logic unit, and a program counter, which is operational to accept a memory address from the instruction register, is improved by adding a page register which is connected to the instruction register. The page register is operational to accept a memory page value from a first instruction word of a two word instruction, such as a Branch instruction, at approximately the same time the program counter accepts a memory address from a second instruction word of the two word instruction. Page decode circuitry is connected to an output of the page register for selecting one memory page from a plurality of memory pages. Furthermore, a page stack can be provided to operate in conjunction with an address stack to improve Call instructions.

DESCRIPTION OF THE DRAWINGS

Other features and advantages of the present invention will become apparent by reference to the following detailed description when considered in conjunction with the accompanying drawings, in which:

FIGS. 2A and 2B together are a block diagram of an improved data processing device with access to off-chip memory, with a page register and a page stack according to the present invention;

Corresponding numerals and symbols in the different figures and tables refer to corresponding parts unless otherwise indicated.

DETAILED DESCRIPTION OF PREFERRED EMBODIMENTS OF THE INVENTION

Figure 1A:
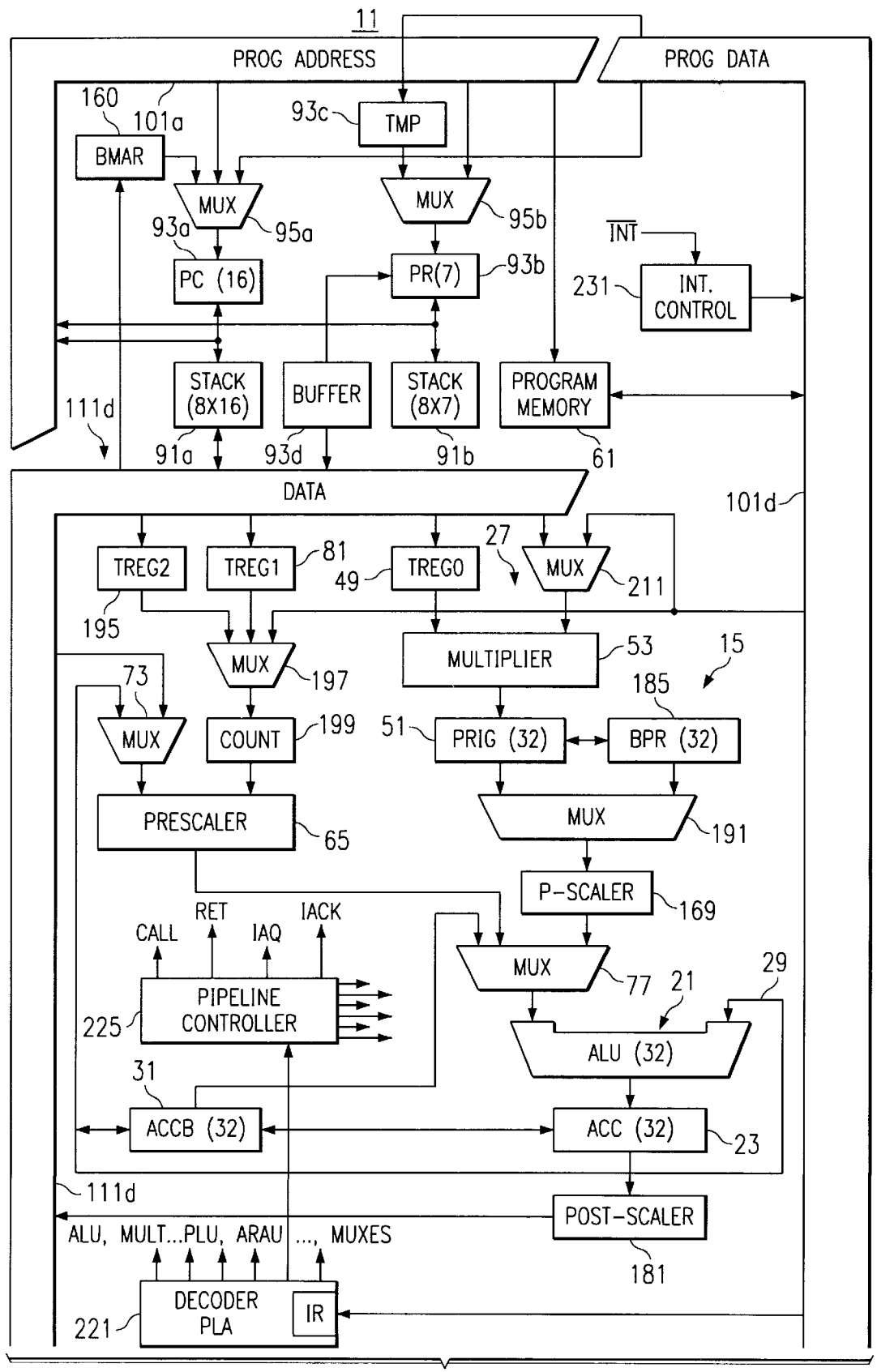
FIGS. 1A and 1B together are a block diagram of an improved data processing device with a page register and a page stack according to the present invention.
Figure 1B:
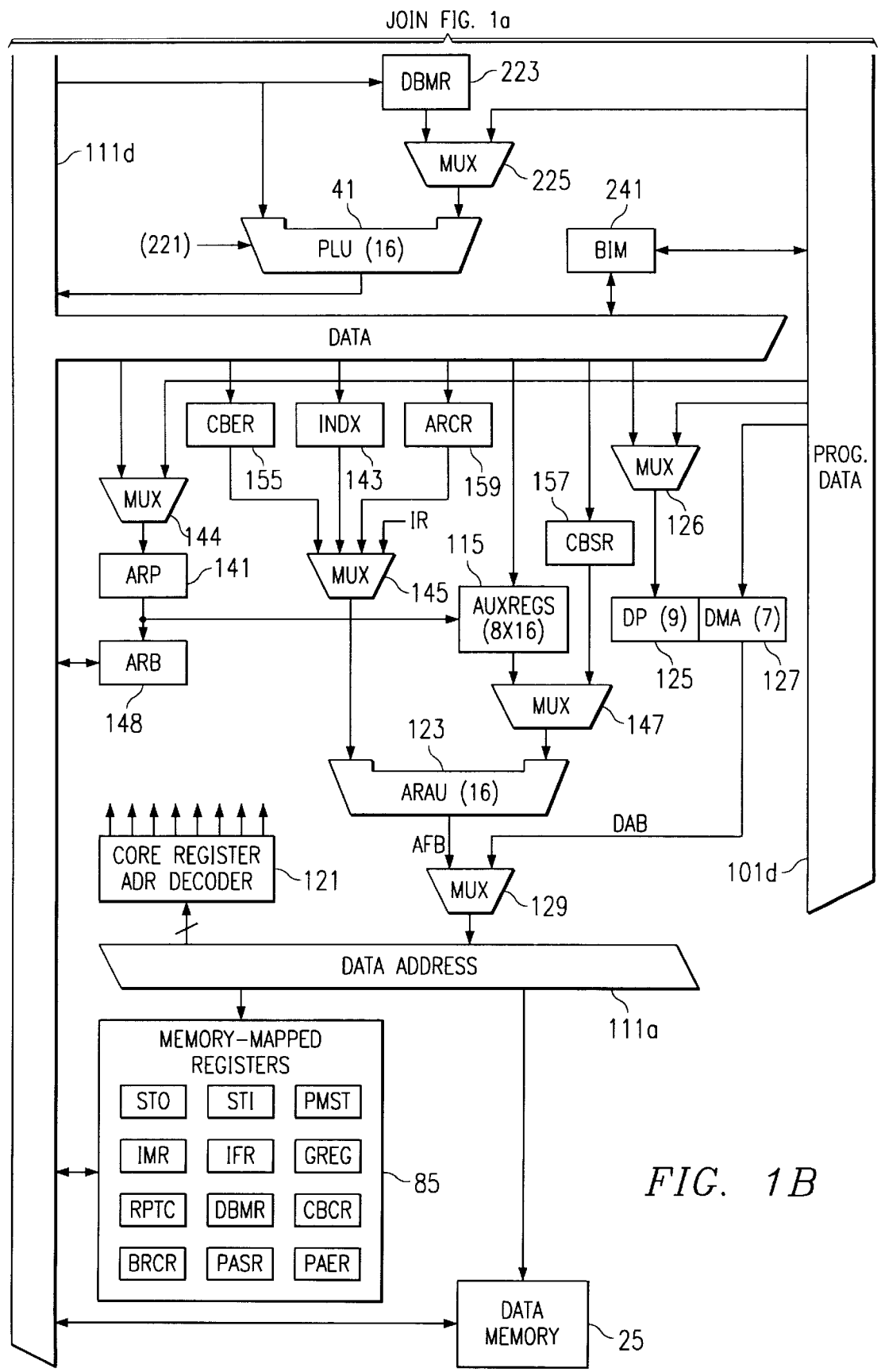

The microcomputer device to be described herein is primarily used for signal processing, but the concepts herein may be used in processor devices of various configurations, and these devices may be used in many different systems. An aspect of the present invention is an improvement to a microcomputer described in detail in U.S. Pat. No. 5,072,418, incorporated herein by reference. FIGS. 1A and 1B together provide a block diagram of a data processing device which has been improved with aspects of the present invention. A detailed description of the microcomputer of FIGS. 1A–1B is given in U.S. Pat. No. 5,072,418, except for the present improvements, and therefore will not be repeated here.

In FIG. 1A, a page register 93*b* is provided which advantageously increases the instruction address range of microcomputer 11 by 7 bits, such that the address range is 23 bits. An advantage of the present invention is that page register 93*b* may be loaded with seven bits from a Branch or Call instruction which were previously unused bits. Table A illustrates a representative instruction set which can be executed by microcomputer 11. This instruction set is fully described in U.S. Pat. No. 5,072,418 and will not be described in detail here. The general form of the instruction set is for bits 0–6 to contain an indirect address field when bit 7 is equal to a 1. This indirect address field may be used for accessing data. It has now been determined that during the execution of a Branch or Call instruction, there is no need to access data. Therefore, the indirect address field is not needed for a Branch or Call instruction. Branch and Call instructions are two word instructions, and a second instruction word provides the address which is used by a Branch or Call instruction. According to the present invention, bit 7 in the first word of a Branch or Call instruction can be set to 0 to indicate that an indirect address is not provided and bits 0–6 of the first word of the Branch or Call instruction can be used to provide a page value, as shown in Table A, which may be loaded into page register 93*b*.

Figure 3:
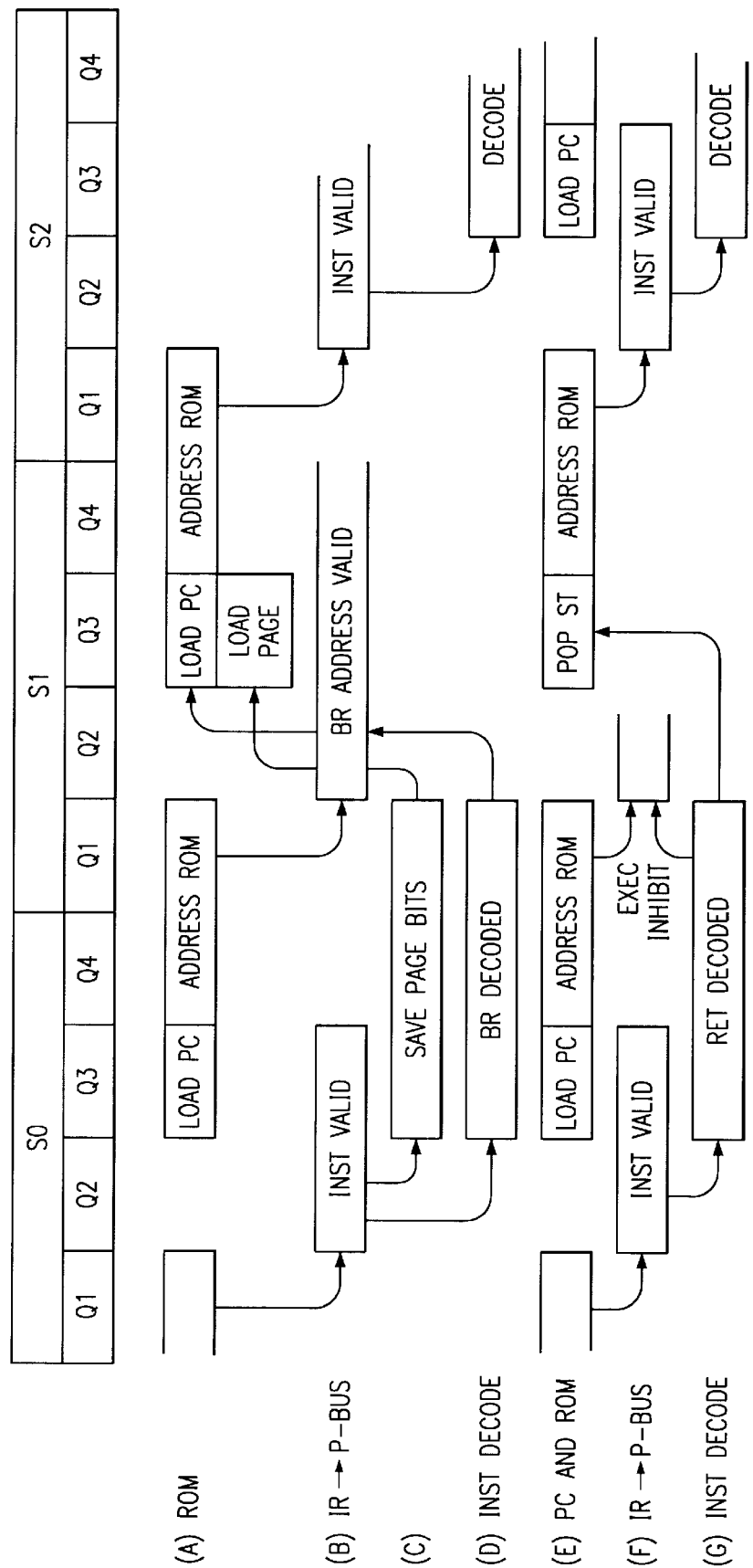
FIG. 3 are timing diagrams of the data processing devices of FIGS. 1 and 2.

FIG. 3 illustrates the timing for loading page register 93*b*. When a Branch or Call instruction is decoded by instruction decoder 221 at time Q3 of state S0, program counter 93*a* is incremented and a second word of a two word instruction is fetched from program memory 61 to provide a branch address. According to the present invention, when bit 7 is a zero, bits 0–6 of a Branch or Call instruction contain a page value which is to be loaded into page register 93*b*; however, the page register cannot be loaded until time Q3 of state S1.

Therefore, the page value is stored in TMP register 93c during state S0, as shown in FIG. 3C. In state S1, a branch address has been obtained from program memory and the branch address and the page value are simultaneously loaded into program counter 93a and page register 93b, respectively, at time Q3 of state S1. Thereafter, program accesses to program memory are made from a memory page specified by the new page value. Thus, the program address range of microcomputer 11 is advantageously extended without incurring any performance delay or requiring any additional instructions.

Program memory 61 can be any size which can be addressed by the combined address range of program counter 93a and page register 93b. An aspect of the present invention is that certain data structures may be replicated on each page of expanded memory 61 so that certain functions, such as interrupt operation, will not be affected by the value contained in the page register.

A further improvement in accordance with the present invent is embodied by page stack 91b. Page stack 91b operates in conjunction with stack 91a to store a page value from page register 93b in page stack 91b whenever a program counter value is saved on stack 91a. Circuitry is provided so that a page value from page stack 91b can be restored in page register 93b in accordance with the operation of stack 91a. The operation of stack 91a is described in detail in U.S. Pat. 5,072,418. Page stack 91b operates in the same manner and responds to the same controls as stack 91a.

Buffer 93d permits a page value to be loaded into page register 93b from any source on data bus 111D, such as arithmetic logic unit 21. Buffer 93d also permits a value in page register 93b to be read out and transferred to any destination on data bus 111D. Page register 93b is given a memory mapped address so that can be accessed using data movement instructions similarly to other memory mapped registers within microcomputer 11.

Figure 2B:
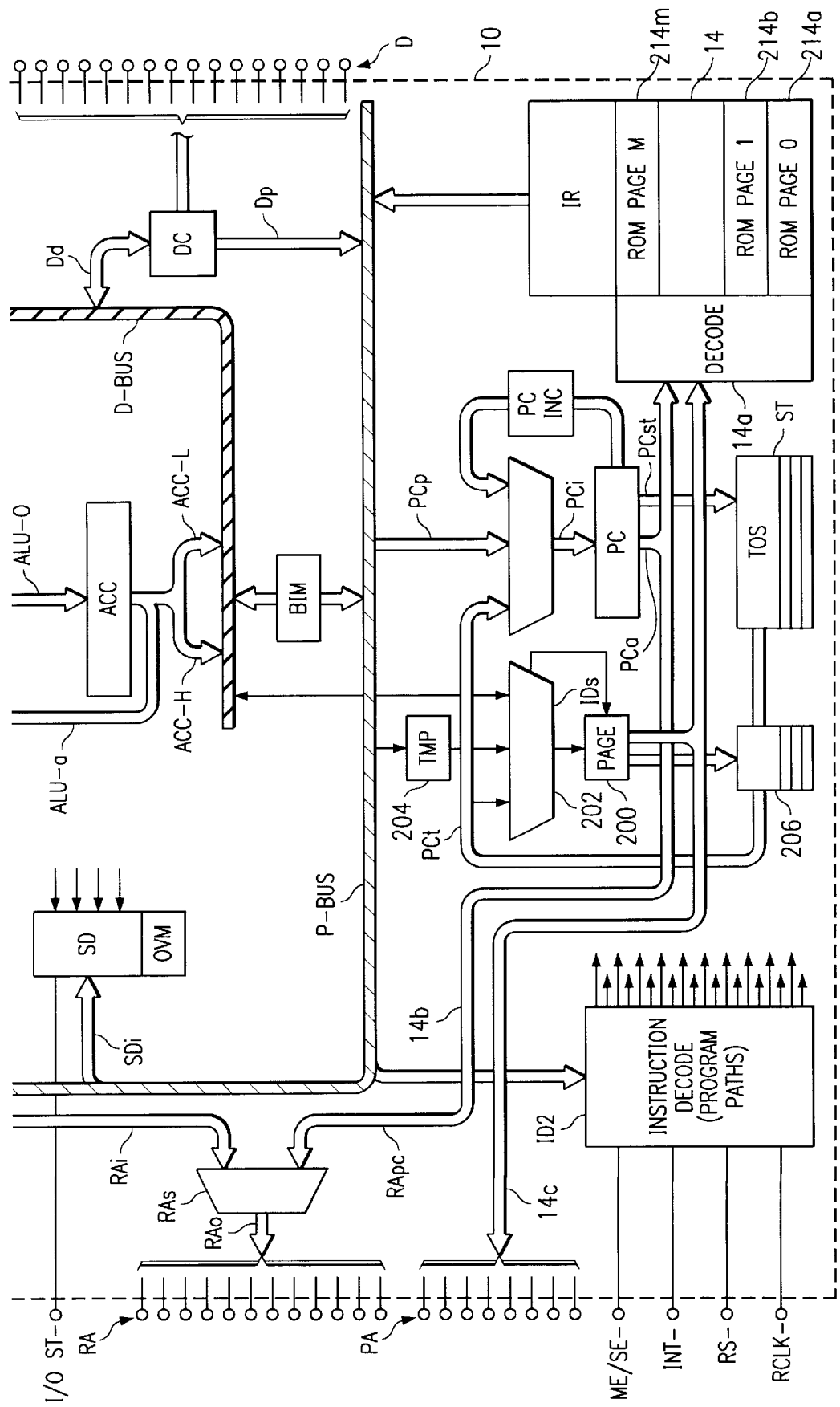

Another embodiment of the present invention is illustrated in FIGS. 2A–2B. An aspect of the present invention is an improvement to a microcomputer described in detail in U.S. Pat. No. 4,713,748, incorporated herein by reference. FIGS. 2A and 2B together provide a block diagram of a data processing device which has been improved with aspects of the present invention. A detailed description of the microcomputer of FIGS. 2A–2B is given in U.S. Pat. No. 4,713,748, except for the present improvements, and therefore will not be repeated here.

In FIG. 2B, page register 200, temporary register 204, and page stack 206 operate similarly to the description given above for FIG. 1A. A further aspect of the present invention is shown by ROM page address bus 14c which provides a page address value to external program memory via page address pads PA.

Decoder 14a decodes a page address provided on page address bus 14c and selects one page of memory from ROM 14 which has a plurality of pages 214a–214m, such that a first page is selected when a page value of "00" is presented, and a second page is selected when a page value of "01" is presented, etc. Decoder 14a may alternatively provide various mapping functions or provide non-sequential selections of pages 214a–214m.

Another embodiment of the present invention is a modification of the embodiment of FIGS. 1A–1B in which page stack 91b is not provided. Likewise, another embodiment of the present invention is a modification of the embodiment of FIGS. 2A–2B in which page stack 206 is not provided. In either such embodiment, subroutines could be supported by first executing a BR instruction to a selected page, such as page 0, and then executing a CALL instruction on the same page. After returning from the subroutine, a second BR could be executed to return to the original page and thus complete the execution of the subroutine.

Figure 4:
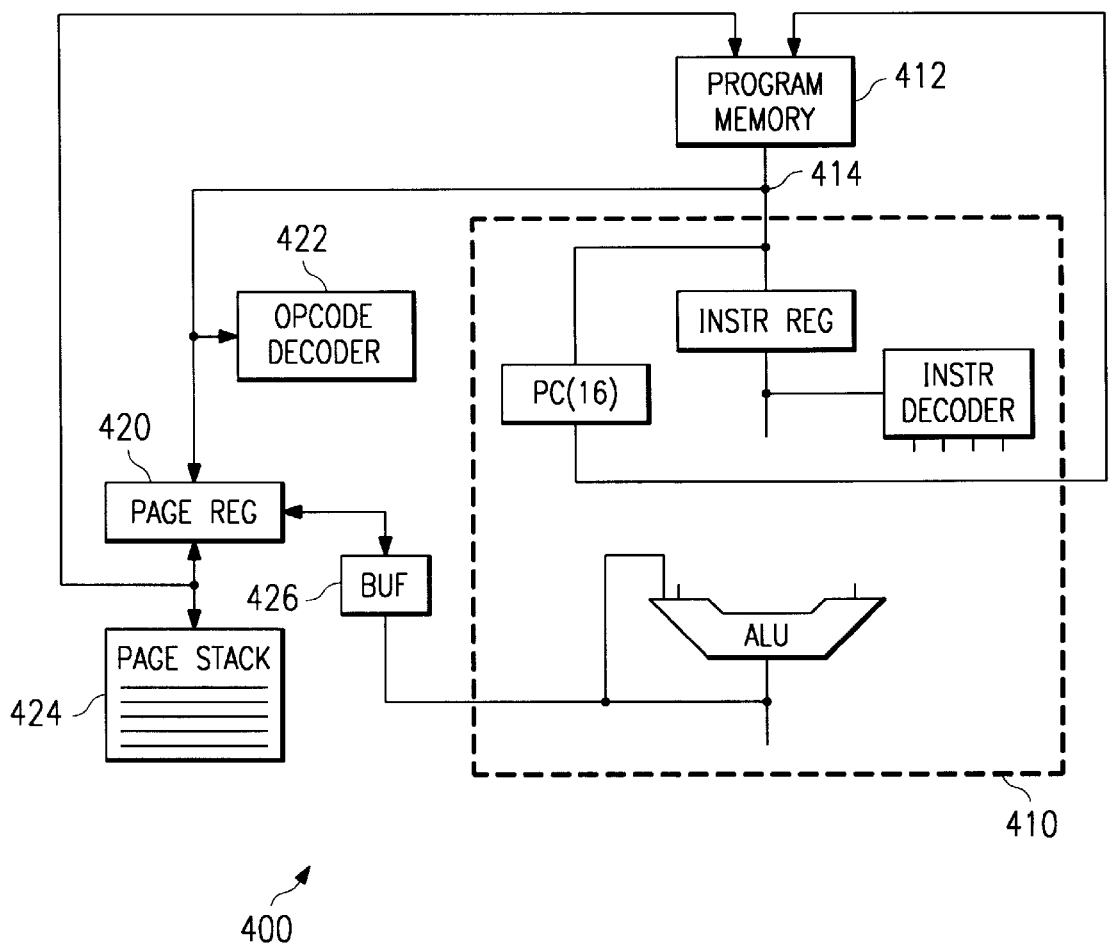
FIG. 4 is an Application Specific Integrated Circuit with a microprocessor cell improved with a page register and a page stack according to the present invention.

Another embodiment of the present invention involves locating a page register and optionally a page stack external to an existing microprocessor, such as a microprocessor as described in U.S. Pat. No. 5,072,418 and 4,713,748. Such an existing microprocessor may be a predesigned cell that is incorporated into a larger integrated circuit. Such integrated circuits are often referred to as "Application Specific Integrated Circuits," or ASICs. An advantage of the present invention is that a predesigned microprocessor cell can be upgraded according to the present invention to have a wider address space without requiring that the microprocessor cell be redesigned and revalidated. FIG. 4 illustrates an ASIC 400 with a microprocessor cell 410 and program memory 412. ASIC 400 will typically have many other types of cells and memories, some of which may interconnect with cell 410.

In order to upgrade predesigned microprocessor cell 410, a connection can be made to an instruction bus 414 in order to monitor instruction opcodes with a simple opcode decoder 422 which is located on the ASIC external to the microprocessor cell. When a BR or CALL instruction is decoded, a page value from the instruction bus is then stored, as discussed above for FIGS. 1 and 2, in an page register 420 which is provided on the ASIC externally to the microprocessor cell. Similarly, a page stack 424 may be provided on the ASIC externally to the microprocessor cell, which is controlled by the opcode decoder and which operates as described in the preceding discussion of FIGS. 1 and 2. It is to be noted that page stack 424 may be omitted in some embodiments, as discussed previously.

Page register 420 may be connected via buffer 426 to an internal data bus of cell 410 to allow the contents of page register 420 to be read or modified when opcode decoder 422 decodes a read or write instruction at a predetermined address.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

TABLE A

Instruction Set

| Mnemonic | Description | No. Words | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| ACCUMULATOR MEMORY REFERENCE INSTRUCTIONS ||||||||||||||||||
| ABS | Absolute value of accumulator | 1 | 1 | 1 | 0 | 0 | 1 | 1 | 1 | 0 | 0 | 0 | 0 | 1 | 1 | 0 | 1 | 1 |
| ADD | Add to accumulator with shift | 1 | 0 | 0 | 0 | 0 | S | | | | 1 | | | | D | | | |
| ADDH | Add to high accumulator | 1 | 0 | 1 | 0 | 0 | 1 | 0 | 0 | 0 | 1 | | | | D | | | |
| ADDS | Add to low accumulator with sign extension suppressed | 1 | 0 | 1 | 0 | 0 | 1 | 0 | 0 | 1 | 1 | | | | D | | | |
| ADDT | Add to accumulator with shift specified by T register | 1 | 0 | 1 | 0 | 0 | 1 | 0 | 1 | 0 | 1 | | | | D | | | |
| ADLK | Add to accumulator long immediate with shift | 2 | 1 | 1 | 0 | 1 | S | | | | 0 | 0 | 0 | 0 | 0 | 0 | 1 | 0 |
| AND | AND with accumulator | 1 | 0 | 1 | 0 | 0 | 1 | 1 | 1 | 0 | 1 | | | | D | | | |
| ANDK | AND immediate with accumulator with shift | 2 | 1 | 1 | 0 | 1 | S | | | | 0 | 0 | 0 | 0 | 0 | 1 | 0 | 0 |
| CMPL | Complement accumulator | 1 | 1 | 1 | 0 | 0 | 1 | 1 | 1 | 0 | 0 | 0 | 1 | 0 | 0 | 1 | 1 | 1 |
| LAC | Load accumulator with shift | 1 | 0 | 0 | 1 | 0 | S | | | | 1 | | | | D | | | |
| LACK | Load accumulator immediate short | 1 | 1 | 1 | 0 | 0 | 1 | 0 | 1 | 0 | | | | | K | | | |
| LACT | Load accumulator with shift specified by T register | 1 | 0 | 1 | 0 | 0 | 0 | 0 | 1 | 0 | 1 | | | | D | | | |
| LALK | Load accumulator long immediate with shift | 2 | 1 | 1 | 0 | 1 | S | | | | 0 | 0 | 0 | 0 | 0 | 0 | 0 | 1 |
| NEG | Negate accumulator | 1 | 1 | 1 | 0 | 0 | 1 | 1 | 1 | 0 | 0 | 0 | 1 | 0 | 0 | 0 | 1 | 1 |
| NORM | Normalize contents of accumulator | 1 | 1 | 1 | 0 | 0 | 1 | 1 | 1 | 0 | 1 | 0 | 1 | 0 | 0 | 0 | 1 | 0 |
| OR | OR with accumulator | 1 | 0 | 1 | 0 | 0 | 1 | 1 | 0 | 1 | 1 | | | | D | | | |
| ORK | OR immediate with accumulator with shift | 2 | 1 | 1 | 0 | 1 | S | | | | 0 | 0 | 0 | 0 | 0 | 1 | 0 | 1 |
| SACH | Store high accumulator with shift | 1 | 0 | 1 | 1 | 0 | 1 | X | | 1 | | | | D | | | | |
| SACL | Store low accumulator with shift | 12 | 0 | 1 | 1 | 0 | 0 | X | | 1 | | | | D | | | | |
| SBLK | Subtract from accumulator long immediate with shift | 2 | 1 | 1 | 0 | 1 | S | | | | 0 | 0 | 0 | 0 | 0 | 0 | 1 | 1 |
| SFL | Shift accumulator left | 1 | 1 | 1 | 0 | 0 | 1 | 1 | 1 | 0 | 0 | 0 | 0 | 1 | 1 | 0 | 0 | 0 |
| SFR | Shift accumulator right | 1 | 1 | 1 | 0 | 0 | 1 | 1 | 1 | 0 | 0 | 0 | 0 | 1 | 1 | 0 | 0 | 1 |
| SUB | Subtract from accumulator with shift | 1 | 0 | 0 | 0 | 1 | S | | | | 1 | | | | D | | | |
| SUBC | Conditional subtract | 1 | 0 | 1 | 0 | 0 | 0 | 1 | 1 | 1 | 1 | | | | D | | | |
| SUBH | Subtract from high accumulator | 1 | 0 | 1 | 0 | 0 | 0 | 1 | 0 | 0 | 1 | | | | D | | | |
| SUBS | Subtract from low accumulator with sign extension suppressed | 1 | 0 | 1 | 0 | 0 | 0 | 1 | 0 | 1 | 1 | | | | D | | | |
| SUBT | Subtract from accumulator with shift specified by T register | 1 | 0 | 1 | 0 | 0 | 0 | 1 | 1 | 0 | 1 | | | | D | | | |
| XOR | Exclusive-OR with accumulator | 1 | 0 | 1 | 0 | 0 | 1 | 1 | 0 | 0 | 1 | | | | D | | | |
| XORK | Exclusive-OR immediate with accumulator with shift | 2 | 1 | 1 | 0 | 1 | S | | | | 0 | 0 | 0 | 0 | 0 | 1 | 1 | 0 |
| ZAC | Zero accumulator | 1 | 1 | 1 | 0 | 0 | 1 | 0 | 1 | 0 | 0 | 0 | 0 | 0 | 0 | 0 | 0 | 0 |
| ZALH | Zero low accumulator and load high accumulator | 1 | 0 | 1 | 0 | 0 | 0 | 0 | 0 | 0 | 1 | | | | D | | | |
| ZALS | Zero accumulator and load lwo | 1 | 0 | 1 | 0 | 0 | 0 | 0 | 0 | 1 | 1 | | | | D | | | |
| AUXILIARY REGISTERS AND DATA PAGE POINTER INSTRUCTIONS ||||||||||||||||||
| CMPR | Compare auxiliary register with auxiliary register ARO | 1 | 1 | 1 | 0 | 0 | 1 | 1 | 1 | 0 | 0 | 1 | 0 | 1 | 0 | 0 | <CM> | |
| LAR | Load auxiliary register | 1 | 0 | 0 | 1 | 1 | 0 | R | | | 1 | | | | D | | | |
| LARK | Load auxiliary register immediate short | 1 | 1 | 1 | 0 | 0 | 0 | R | | | | | | K | | | | |
| LARP | Load auxiliary register pointer | 1 | 0 | 1 | 0 | 1 | 0 | 1 | 0 | 1 | 1 | 0 | 0 | 0 | 1 | | R | |
| LDP | Load data memory page pointer | 1 | 0 | 1 | 0 | 1 | 0 | 0 | 1 | 0 | 1 | | | | D | | | |
| LDPK | Load data memory page pointer immediate | 1 | 1 | 1 | 0 | 0 | 1 | 0 | 0 | | | | | K | | | | |
| LRLK | Load auxiliary register long immediate | 2 | 1 | 1 | 0 | 1 | 0 | R | | | 0 | 0 | 0 | 0 | 0 | 0 | 0 | 0 |
| MAR | Modify auxiliary register | 1 | 0 | 1 | 0 | 1 | 0 | 1 | 0 | 1 | 1 | | | | D | | | |
| SAR | Store auxiliary register | 1 | 0 | 1 | 1 | 1 | 0 | R | | | 1 | | | | D | | | |
| AUXILIARY REGISTERS AND DATA PAGE POINTER INSTRUCTIONS ||||||||||||||||||
| APAC | Add P register to accumulator | 1 | 1 | 1 | 0 | 0 | 1 | 1 | 1 | 0 | 0 | 0 | 0 | 1 | 0 | 1 | 0 | 1 |
| LPH | Load high P register | 1 | 0 | 1 | 0 | 1 | 0 | 0 | 1 | 1 | 1 | | | | D | | | |
| LT | Load T register | 1 | 0 | 0 | 1 | 1 | 1 | 1 | 0 | 0 | 1 | | | | D | | | |
| LTA | Load T register and accumulate previous product | 1 | 0 | 0 | 1 | 1 | 1 | 1 | 0 | 1 | 1 | | | | D | | | |
| LTD | Load T register, accumulate previous product, and move data | 1 | 0 | 0 | 1 | 1 | 1 | 1 | 1 | 1 | 1 | | | | D | | | |
| LTP | Load T register and store P register in accumulator | 1 | 0 | 0 | 1 | 1 | 1 | 1 | 1 | 0 | 1 | | | | D | | | |
| LTS | Load T register and subtract previous product | 1 | 0 | 1 | 0 | 1 | 1 | 0 | 1 | 1 | 1 | | | | D | | | |
| MAC | Multiply and accumulate | 2 | 0 | 0 | 1 | 1 | 1 | 0 | 1 | 0 | 1 | | | | D | | | |

TABLE A-continued

Instruction Set

| Mnemonic | Description | No. Words | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| MACD | Multiply and accumulate with data move | 2 | 0 | 0 | 1 | 1 | 1 | 0 | 1 | 1 | 1 | | | | D | | | |
| MPY | Multiply (with T register, store product in P register) | 1 | 0 | 0 | 1 | 1 | 1 | 0 | 0 | 0 | 1 | | | | D | | | |
| MPYK | Multiply immediate | 1 | 1 | 0 | 1 | | | | | | K | | | | | | | |
| PAC | Load accumulator with P register | 1 | 1 | 1 | 0 | 0 | 1 | 1 | 1 | 0 | 0 | 0 | 0 | 1 | 0 | 1 | 0 | 0 |
| SPAC | Subtract P register from accumulator | 1 | 1 | 1 | 0 | 0 | 1 | 1 | 1 | 0 | 0 | 0 | 0 | 1 | 0 | 1 | 1 | 0 |
| SPM | Set P register output shift mode | 1 | 1 | 1 | 0 | 0 | 1 | 1 | 1 | 0 | 0 | 0 | 0 | 0 | 1 | 0 | <PM> | |
| SQRA | Square and accumulate | 1 | 0 | 0 | 1 | 1 | 1 | 0 | 0 | 1 | 1 | | | | D | | | |
| SQRS | Square and subtract previous product | 1 | 0 | 1 | 0 | 1 | 1 | 0 | 1 | 0 | 1 | | | | D | | | |
| BRANCH/CALL INSTRUCTIONS | | | | | | | | | | | | | | | | | | |
| B | Branch unconditionally | 2 | 1 | 1 | 1 | 1 | 1 | 1 | 1 | 0 | <--------------page value--------------> | | | | | | | |
| BACC | Branch to address specified by accumulator | 1 | 1 | 1 | 0 | 0 | 1 | 1 | 1 | 0 | 0 | 0 | 1 | 0 | 0 | 1 | 0 | 1 |
| BANZ | Branch on auxiliary register not zero | 2 | 1 | 1 | 1 | 1 | 1 | 0 | 1 | 1 | 1 | | | | D | | | |
| BBNZ | Branch if TC bit ≠ 0 | 2 | 1 | 1 | 1 | 1 | 1 | 0 | 0 | 1 | 1 | | | | D | | | |
| BBZ | Branch if TC bit = 0 | 2 | 1 | 1 | 1 | 1 | 1 | 0 | 0 | 0 | 1 | | | | D | | | |
| BGEZ | Branch if accumulator/0 | 2 | 1 | 1 | 1 | 1 | 0 | 1 | 0 | 0 | 1 | | | | D | | | |
| BGZ | Branch if accumulator > 0 | 2 | 1 | 1 | 1 | 1 | 0 | 0 | 0 | 1 | 1 | | | | D | | | |
| BIOZ | Branch on I/O status = 0 | 2 | 1 | 1 | 1 | 1 | 1 | 0 | 1 | 0 | 1 | | | | D | | | |
| BLEZ | Branch if accumulator ≤ 0 | 2 | 1 | 1 | 1 | 1 | 0 | 0 | 1 | 0 | 1 | | | | D | | | |
| BLZ | Branch if accumulator < 0 | 2 | 1 | 1 | 1 | 1 | 0 | 0 | 1 | 1 | 1 | | | | D | | | |
| BNV | Branch if no overflow | 2 | 1 | 1 | 1 | 1 | 0 | 1 | 1 | 1 | 1 | | | | D | | | |
| BNZ | Branch if accumulator ≠ 0 | 2 | 1 | 1 | 1 | 1 | 0 | 1 | 0 | 1 | 1 | | | | D | | | |
| BV | Branch on overflow | 2 | 1 | 1 | 1 | 1 | 0 | 0 | 0 | 0 | 1 | | | | D | | | |
| CALA | Call subroutine indirect | 1 | 1 | 1 | 0 | 0 | 1 | 1 | 1 | 0 | 0 | 0 | 1 | 0 | 0 | 1 | 0 | 0 |
| CALL | Call subroutine | 2 | 1 | 1 | 1 | 1 | 1 | 1 | 0 | 0 | <--------------page value--------------> | | | | | | | |
| RET | Return from subroutine | 1 | 1 | 1 | 0 | 0 | 1 | 1 | 0 | 0 | 1 | 0 | 0 | 1 | 1 | 0 | | |
| CONTROL INSTRUCTIONS | | | | | | | | | | | | | | | | | | |
| BIT | Test bit | 1 | 1 | 0 | 0 | 1 | | | B | | 1 | | | | D | | | |
| BITT | Test bit specified by T register | 1 | 0 | 1 | 0 | 12 | 0 | 1 | 1 | 1 | | | | D | | | | |
| CNFD | Configure block as data memory | 1 | 1 | 1 | 0 | 0 | 1 | 1 | 1 | 0 | 0 | 0 | 0 | 0 | 1 | 0 | 0 | |
| CNFP | Configure block as program memory | 1 | 1 | 1 | 0 | 0 | 1 | 1 | 1 | 0 | 0 | 0 | 0 | 0 | 1 | 0 | 1 | |
| DINT | Disable interrupt | 1 | 1 | 1 | 0 | 0 | 1 | 1 | 1 | 0 | 0 | 0 | 0 | 0 | 0 | 0 | 1 | |
| EINT | Enable interrupt | 1 | 1 | 1 | 0 | 0 | 1 | 1 | 1 | 0 | 0 | 0 | 0 | 0 | 0 | 0 | 0 | |
| IDLE | Idle until interrupt | 1 | 1 | 1 | 0 | 0 | 1 | 1 | 1 | 0 | 0 | 0 | 1 | 1 | 1 | 1 | 1 | |
| LST | Load status register ST0 | 1 | 0 | 1 | 0 | 1 | 0 | 0 | 0 | 0 | 1 | | | | D | | | |
| LST1 | Load status register ST1 | 1 | 0 | 1 | 0 | 1 | 0 | 0 | 1 | 1 | | | | D | | | | |
| NOP | No operation | 1 | 0 | 1 | 0 | 1 | 0 | 1 | 0 | 0 | 0 | 0 | 0 | 0 | 0 | 0 | | |
| POP | Pop top of stack to low accumulator | 1 | 1 | 1 | 0 | 0 | 1 | 1 1 | 0 | 0 | 0 | 0 | 1 | 1 | 1 | 0 | 1 | |
| POPD | Pop top of stack to data memory | 1 | 0 | 1 | 1 | 1 | 1 | 0 | 1 | 0 | 1 | | | | D | | | |
| PSHD | Push data memory value onto stack | 1 | 0 | 1 | 0 | 1 | 0 | 1 | 0 | 0 | 1 | | | | D | | | |
| PUSH | Push low accumulator onto stack | 1 | 1 | 1 | 0 | 0 | 1 | 1 | 1 | 0 | 0 | 0 | 0 | 1 | 1 | 1 | 0 | 0 |
| ROVM | Reset overflow mode | 1 | 1 | 1 | 0 | 0 | 1 | 1 | 1 | 0 | 0 | 0 | 0 | 0 | 0 | 1 | 0 | |
| RPT | Repeat instruction as specified by data memmory value | 1 | 0 | 1 | 0 | 0 | 1 | 0 | 1 | 1 | 1 | | | | D | | | |
| RPTK | Repeat instruction as specified by immediate value | 1 | 1 | 1 | 0 | 0 | 1 | 0 | 1 | 1 | | | | K | | | | |
| RSXM | Reset sign-extension mode | 1 | 1 | 1 | 0 | 0 | 1 | 1 | 1 | 0 | 0 | 0 | 0 | 0 | 1 | 1 | 0 | |
| SOVM | Set overflow mode | 1 | 1 | 1 | 0 | 0 | 1 | 1 | 1 | 0 | 0 | 0 | 0 | 0 | 1 | 1 | 1 | |
| SST | Store status register ST0 | 1 | 0 | 1 | 1 | 1 | 1 | 0 | 0 | 0 | 1 | | | | D | | | |
| SST1 | Store status register ST1 | 1 | 0 | 1 | 1 | 1 | 1 | 0 | 0 | 1 | 1 | | | | D | | | |
| SSXM | Set sign-extension mode | 1 | 1 | 1 | 0 | 0 | 1 | 1 | 1 | 0 | 0 | 0 | 0 | 0 | 1 | 1 | 1 | |
| TRAP | Software interrupt | 1 | 1 | 1 | 0 | 0 | 1 | 1 | 1 | 0 | 0 | 0 | 1 | 1 | 1 | 1 | 0 | |
| I/O AND DATA MEMORY OPERATIONS | | | | | | | | | | | | | | | | | | |
| BLKD | Block move from data memory to data memory | 2 | 1 | 1 | 1 | 1 | 1 | 1 | 0 | 1 | 1 | | | | D | | | |
| BLKP | Block move from program memory to data memory | 2 | 1 | 1 | 1 | 1 | 1 | 1 | 0 | 0 | 1 | | | | D | | | |
| DMOV | Data movein data memory | 1 | 0 | 1 | 0 | 1 | 0 | 1 | 1 | 0 | 1 | | | | D | | | |
| FORT | Format serial port registers | 1 | 1 | 1 | 0 | 0 | 1 | 1 | 1 | 0 | 0 | 0 | 0 | 0 | 1 | 1 | 1 | FO |
| IN | Input data from port | 1 | 1 | 0 | 0 | 0 | | | PA | | 1 | | | | D | | | |
| OUT | Output data to port | 1 | 1 | 1 | 1 | 0 | | | PA | | 1 | | | | D | | | |
| RTXM | Reset serial port transmit mode | 1 | 1 | 1 | 0 | 0 | 1 | 1 | 1 | 0 | 0 | 0 | 1 | 0 | 0 | 0 | 0 | 0 |
| RXF | Reset external flag | 1 | 1 | 1 | 0 | 0 | 1 | 1 | 1 | 0 | 0 | 0 | 1 | 0 | 0 | 0 | 0 | 0 |
| STXM | Set serial port transmit mode | 1 | 1 | 1 | 0 | 0 | 1 | 1 | 1 | 0 | 0 | 0 | 1 | 0 | 0 | 0 | 0 | 1 |
| SXF | Set external flag | 1 | 1 | 1 | 0 | 0 | 1 | 1 | 1 | 0 | 0 | 0 | 1 | 0 | 0 | 1 | 0 | 1 |
| TBLR | Table read | 1 | 0 | 1 | 0 | 1 | 1 | 0 | 0 | 0 | 1 | | | | D | | | |
| TBLW | Table write | 1 | 0 | 1 | 0 | 1 | 1 | 0 | 0 | 1 | 1 | | | | D | | | |

What is claimed is:

1. A data processing device having an instruction register for holding an instruction, an instruction decoder, an arithmetic logic unit, a program counter, and a program data bus connected to said instruction register and to said program counter, said program counter operational to accept a memory address from said program data bus, further comprising:

a page register connected to said program data bus, said page register operational to accept a memory page value from said program data bus such that said page register is loaded in conjunction with performing a branch instruction by loading the page register with a set of bits included in the branch instruction, whereby a branch to a new page can be performed in the same amount of time as a branch within a page; and page decode circuitry connected to an output of said page register for selecting one memory page from a plurality of memory pages.

2. The data processing device of claim 1, further comprising:

a stack connected to said program counter for storing a plurality of memory addresses in response to said instruction decoder;

a page stack connected to said page register for storing a plurality of memory page values, each memory page value being associated with a memory address stored in said stack; and wherein said stack and said page stack are operational to restore an associated memory address and memory page value to said program counter and page register in response to said instruction decoder.

3. The data processing device of claim 1, further comprising:

circuitry to connect said arithmetic logic unit to said page register to facilitate transferring a memory page value between said arithmetic logic unit and said page register.

4. The data processing device of claim 1, wherein said instruction is a Branch or a Call instruction.

5. A data processing device comprising a predefined microprocessor cell, said microprocessor cell comprising an instruction register for holding an instruction, an instruction opcode decoder, an arithmetic logic unit, a program counter, and a program data bus connected to said instruction register and to said program counter, said program counter operational to accept a memory address from said program data bus, said program data bus having terminals for an external memory, said data processing device further comprising:

an instruction memory connected to said program data bus terminals of said predefined microprocessor cell;

a second opcode decoder external to said predefined microprocessor cell connected to said program data bus;

a page register external to said predefined microprocessor cell connected to said program data bus and responsive to said second opcode decoder, said page register operational to accept a memory page value from said instruction memory such that said page register is loaded in conjunction with performing a branch instruction by loading the page register with a set of bits included in the branch instruction, whereby a branch to a new page can be performed in the same amount of time as a branch within a page; and page decode circuitry connected to an output of said page register for selecting one memory page from a plurality of memory pages of said instruction memory.

6. The data processing device of claim 5, further comprising:

a stack connected to said program counter for storing a plurality of memory addresses in response to said instruction decoder;

a page stack connected to said page register and responsive to said opcode decoder for storing a plurality of memory page values, each memory page value being associated with a memory address stored in said stack; and wherein said stack and said page stack are operational to restore an associated memory address and memory page value to said program counter and page register in response to said instruction decoder and said opcode decoder.

7. The data processing device of claim 5, further comprising:

circuitry to connect said arithmetic logic unit to said page register to facilitate transferring a memory page value between said arithmetic logic unit and said page register.

8. The data processing device of claim 5, wherein said instruction is a Branch or a Call instruction.

9. A data processing device having an instruction register for holding an instruction, an instruction decoder, an arithmetic logic unit, a program counter, said program counter operational to accept a memory address from a program data bus, further comprising:

a memory circuit for storing a plurality of instruction words connected to said program data bus, said memory circuit organized as a plurality of memory pages;

a page register connected to said memory circuit, said page register operational to conditionally accept a memory page value from said memory circuit such that said page register is loaded in conjunction with performing a branch instruction by loading the page register with a set of bits included in the branch instruction, whereby a branch to a new page can be performed in the same amount of time as a branch within a page; and page decode circuitry connected to an output of said page register for selecting one memory page from said plurality of memory pages of said memory circuit.

10. The data processing device of claim 9, wherein said page register is operable to conditionally accept said memory page value in response to a first bit in said branch instruction.

* * * * *